United States Patent
Morong

[11] Patent Number: 6,052,937
[45] Date of Patent: Apr. 25, 2000

[54] FISHING ROD HOLDER DEVICE

[76] Inventor: Richard Morong, 9432 N. Darr Rd., Free Soil, Mich. 49411

[21] Appl. No.: 09/061,003

[22] Filed: Apr. 15, 1998

[51] Int. Cl.[7] .................................................. A01K 97/10
[52] U.S. Cl. ............................................................. 43/21.2
[58] Field of Search .............................. 43/21.2; 248/538, 248/514

[56] References Cited

U.S. PATENT DOCUMENTS

| | | | |
|---|---|---|---|
| 2,680,924 | 6/1954 | Menegay | 43/21.2 |
| 3,724,791 | 4/1973 | Mason | 248/42 |
| 4,366,640 | 1/1983 | Clapp | 43/21.2 |
| 4,527,349 | 7/1985 | Emory | 43/21.2 |
| 4,551,939 | 11/1985 | Kitchens | 43/21.2 |
| 4,650,146 | 3/1987 | Duke | 43/21.2 |
| 4,753,029 | 6/1988 | Shaw | 43/21.2 |
| 4,793,086 | 12/1988 | Cup | 43/21.2 |
| 5,014,458 | 5/1991 | Wagner | 43/21.2 |
| 5,065,540 | 11/1991 | Potter, Jr. | |
| 5,121,565 | 6/1992 | Wille | 43/21.2 |
| 5,345,708 | 9/1994 | Loyd | |
| 5,438,789 | 8/1995 | Emory | 43/21.2 |
| 5,551,183 | 9/1996 | Solem | |
| 5,557,876 | 9/1996 | Parker | |
| 5,588,630 | 12/1996 | Chen-Chao | 248/514 |
| 5,662,306 | 9/1997 | Dysarz | 248/514 |
| 5,685,107 | 11/1997 | Sweet | 43/21.2 |

*Primary Examiner*—Kurt Rowan
*Attorney, Agent, or Firm*—Michael I. Kroll

[57] ABSTRACT

A fishing rod holder device (20) comprising a base member (22). A facility (24) is for mounting the base member (22) onto a horizontal support surface (26). A plurality of fishing rod holders (28) are provided. A structure (30) is for attaching each fishing rod holder (28) onto the base member (22) in an upwardly extending angle adjustable manner.

12 Claims, 15 Drawing Sheets

FISHING ROD HOLDER DEVICE

BACKGROUND OF THE INVENTION

1. Field of the Invention

The instant invention relates generally to fishing rod holders and more specifically it relates to a fishing rod holder device that consists of a plurality of fishing rod holders, which are each attached in an adjustable manner onto a base member mounted on a horizontal support surface, such as a gunwale of a boat.

2. Description of the Prior Art

Numerous fishing rod holders have been provided in prior art. For example, U.S. Pat. No. 5,065,540 to Potter, Jr.; U.S. Pat. No. 5,345,708 to Loyd; U.S. Pat. No. 5,551,183 to Solem and U.S. Pat. No. 5,557,876 to Parker all are illustrative of such prior art. While these units may be suitable for the particular purpose to which they address, they would not be as suitable for the purposes of the present invention as heretofore described.

U.S. Pat. No. 5,065,540

Disclosed is a striking rod holder for mounting to a boat, fishing chair or rocket launcher. The striking rod holder includes a first plate, a rod holding tube attached to the first plate, and a second plate for attaching to a surface, where the first plate pivotally attaches to the second plate. A cushion material may be positioned between the first plate and the second plate. A locking device can further be included with the striking rod holder, to maintain the tube in a fixed position. Also disclosed, is a method to convert a non-tilting rod holder or a flush-mounted fixed striking rod holder into a tilting rod holder.

U.S. Pat. No. 5,345,708

An ice fishing support assembly for a fishing rod which carries a fishing line. The support assembly includes a pivotally mounted fishing rod holder having a spring connected thereto to bias the holder to an angular position relative to the horizontal, and a latching rod connected to the holder for retaining the fishing rod in a cocked position. The latching rod is pivotally mounted to a base member intermediate the ends of the latching rod, wherein one of the ends of the latching rod projects over the fishing rod and where the other end of the latching rod includes an open ended eyelet for engaging a stretch of the fishing line, so that tension on the line produces rotation of the latching rod.

U.S. Pat. No. 5,551,183

A hands-free fishing system with a signaling flag comprising a fishing rod formed of a handle at its lower extent and a cylindrical rod at its upper extent is disclosed. An upper extent of the rod has a region for the receipt of a portion of a bracket. A reel is secured to the handle with a line extending upwardly through the eyelet of the rod and the eyelet of the post and downwardly therefrom to the area being fished. An upwardly extending cylindrical support extends upwardly to receive the lower end of the handle, whereby when fishing in a hands-free mode, a fish biting on the line will pull the line to pivot the post and raise the flag as an indicator that a bite has occurred.

U.S. Pat. No. 5,557,876

A tubular fishing rod holder capable of being used from a bank of a body of water or from a boat. The fishing rod holder having a rearward end, a mounting portion and a holding portion, wherein the holding portion is adapted to accommodate the handle portion of, for example, spinning, spin casting or bait casting fishing rods. The mounting portion comprises a top receiving hole, a bottom receiving hole and a side cutout portion connecting the top and bottom receiving holes, wherein the top receiving hole is positioned further away from the rearward end than the bottom receiving hole, such that the side cutout portion is preferably formed at a forty five degree angle. The mounting portion allows the fishing rod holder to be removably mounted to a support in a cantilevered arrangement, so that the fishing rod holder will position a fishing rod with easy reach of a fisherman.

SUMMARY OF THE INVENTION

A primary object of the present invention is to provide a fishing rod holder device that will overcome the shortcomings of the prior art devices.

Another object is to provide a fishing rod holder device that is safe to use, by supplying a handle with a spring biased collar as a gripping means for installing and adjusting the fishing rod holders thereto.

An additional object is to a fishing rod holder device that includes a base member for attaching in an adjustable manner a plurality of fishing rod holders onto a gunwale of a boat, thereby protecting the boat from damage by minimizing the number of holes needed to be drilled for the fishing rod holders.

A further object is to provide a fishing rod holder device that is simple and easy to use.

A still further object is to provide a fishing rod holder device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Turning now descriptively to the drawings, in which similar reference characters denote similar elements throughout the several views, FIGS. 1 through 18 illustrate the present invention being a fishing rod holder device 10. With regard to the reference numerals used, the following numbering is used throughout the various drawing figures.

20 fishing rod holder device
22 base member of 20
24 mounting facility of 20
26 horizontal support surface
28 fishing rod holder of 20
30 attaching structure of 20
32 elongated rectangular plate for 22
34 mounting hole in 22 of 24
36 plug of 24
38 aperture in 26
40 fastener of 24
42 cylindrical sleeve of 36
44 threaded bore in 42
46 annular flange of 36 on 42
48 opening in 46
50 screw
52 tube of 28
54 open top of 52
56 pivot disk of 28
58 weld between 56 and 60
60 bottom end of 52
62 stationary disk of 30
64 flat area on 62
66 affixing assembly of 30
68 retaining assemblage of 30
70 first side of 56
72 abutting side of 62
74 threaded bore in 62 of 66
76 threaded hole in 22 of 66
78 bolt of 66
80 threaded central aperture in 56 of 68
82 threaded upper offset bore in 62 of 68
84 locking lever of 68
86 threaded shank in 84
88 L-shaped handle of 84
90 cylindrical short leg of 88
92 long arm of 88
94 collar of 84 on 90
96 spring of 84 on 90
98 gunwale of 100
100 boat The fishing rod holder device 20 comprises a base member 22. A facility 24 is for mounting the base member 22 onto a horizontal support surface 26. A plurality of fishing rod holders 28 are provided. A structure 30 is for attaching each fishing rod holder 28 onto the base member 22 in an upwardly extending angle adjustable manner.

The base member 22 is an elongated rectangular plate 32. The mounting facility 24 includes the base member 22 having a plurality of spaced apart mounting holes 34 therethrough. A plurality of plugs 36 are provided. Each plug 36 is secured into an aperture 38 within the horizontal support surface 26 directly under each mounting hole 34 in the base member 22. A plurality of fasteners 40 are also provided. Each fastener 40 extends through one mounting hole 34 in the base member 22 and into one plug 36, thereby allowing the base member 22 to be removably mounting onto the horizontal support surface 26.

Each plug 36 consists of a cylindrical sleeve 42 having a threaded bore 44 therethrough, to receive one fastener 40 being a bolt. An annular flange 46 is about a top end of the cylindrical sleeve 42. The annular flange 46 has a plurality of openings 48 therethrough, so that a plurality of screws 50 can secure the annular flange 46 to the horizontal support surface 26, after the cylindrical sleeve 42 is inserted into the aperture 38 in the horizontal support surface 26. Each fishing rod holder 28 comprises a tube 52 having an open top 54, to receive a handle of a fishing rod (not shown) therein. A pivot disk 56 is vertically attached by welding 58 to a bottom end 60 of the tube 52.

The attaching structure 30 for each fishing rod holder 28 includes a stationary disk 62 having a flat area 64 upon its perimeter. An assembly 66 is for affixing the flat area 64 of the stationary disk 62 transversely across the base member 22, so that the stationary disk 62 stands upright upon the base member 22. An assemblage 68 is for retaining a first side 70 of the pivot disk 56 against an abutting side 72 of the stationary disk 62. The tube 52 can swing and be maintained between forward and rearward stops of a one hundred and eighty degree adjustment swing, when the bottom end 60 of the tube 52 makes contact with the stationary disk 62 (see FIG. 3).

The affixing assembly 66 consists of the stationary disk 62 having a pair of spaced apart threaded bores 74 extending inwardly from the flat area 64. The base member 22 has a pair of threaded holes 76 spaced apart transversely thereacross in alignment with the threaded bores 74 in the stationary disk 62. A pair of bolts 78 are each threaded through the threaded holes 76 in the base member 22 and the threaded bores 74 in the stationary disk 62.

The retaining assemblage 68 comprises the pivot disk 56 having a threaded central aperture 80 therethrough. The stationary disk 62 has a threaded upper offset bore 82 extending inwardly from the abutting side 72. A locking lever 84 has a threaded shank 86 to thread through the threaded central aperture 80 in the pivot disk 56 and into the threaded upper offset bore 82 in the stationary disk 62. When the locking lever 84 is tightened, the pivot disk 56 will be maintained in a stationary position against the stationary disk 62.

Figure 1:
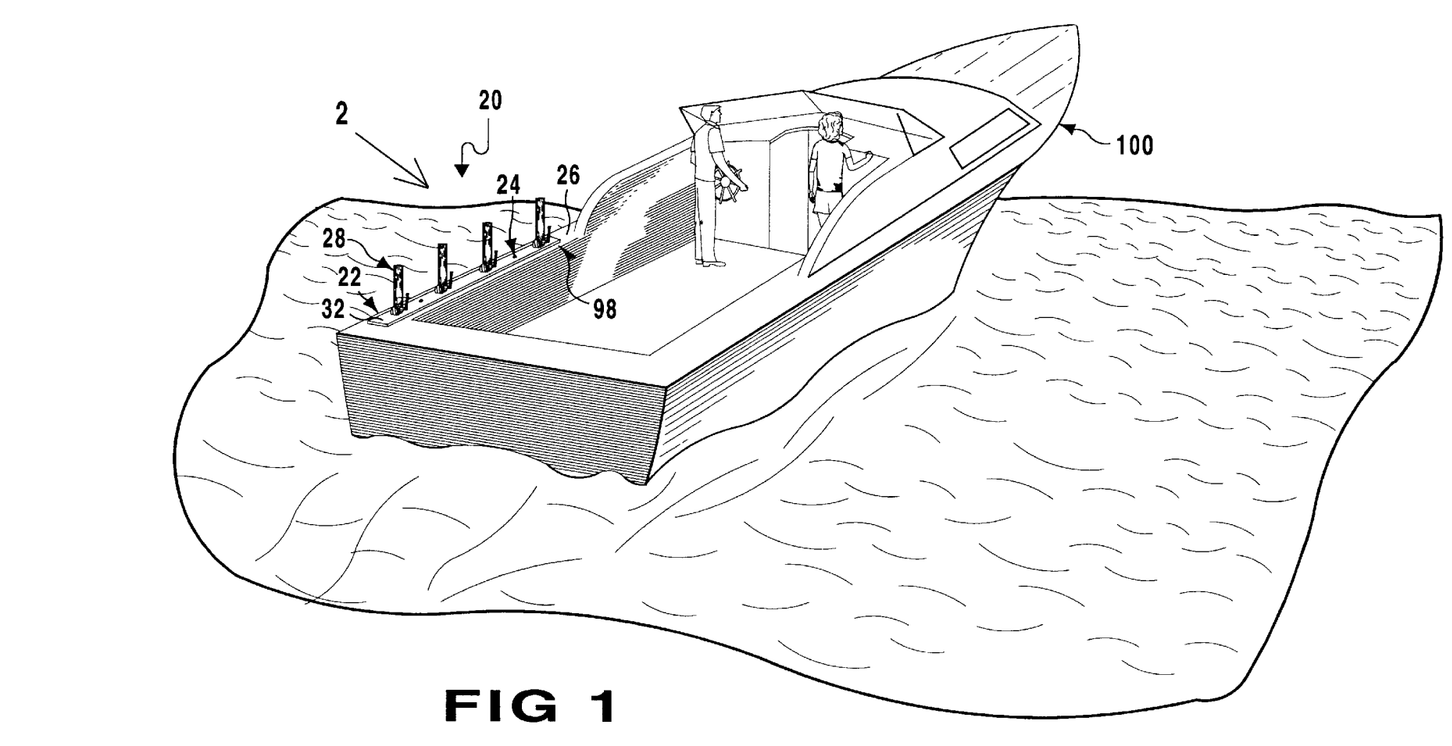
FIG. 1 is a perspective view of a typical boat with the present invention installed thereto.
Figure 2:
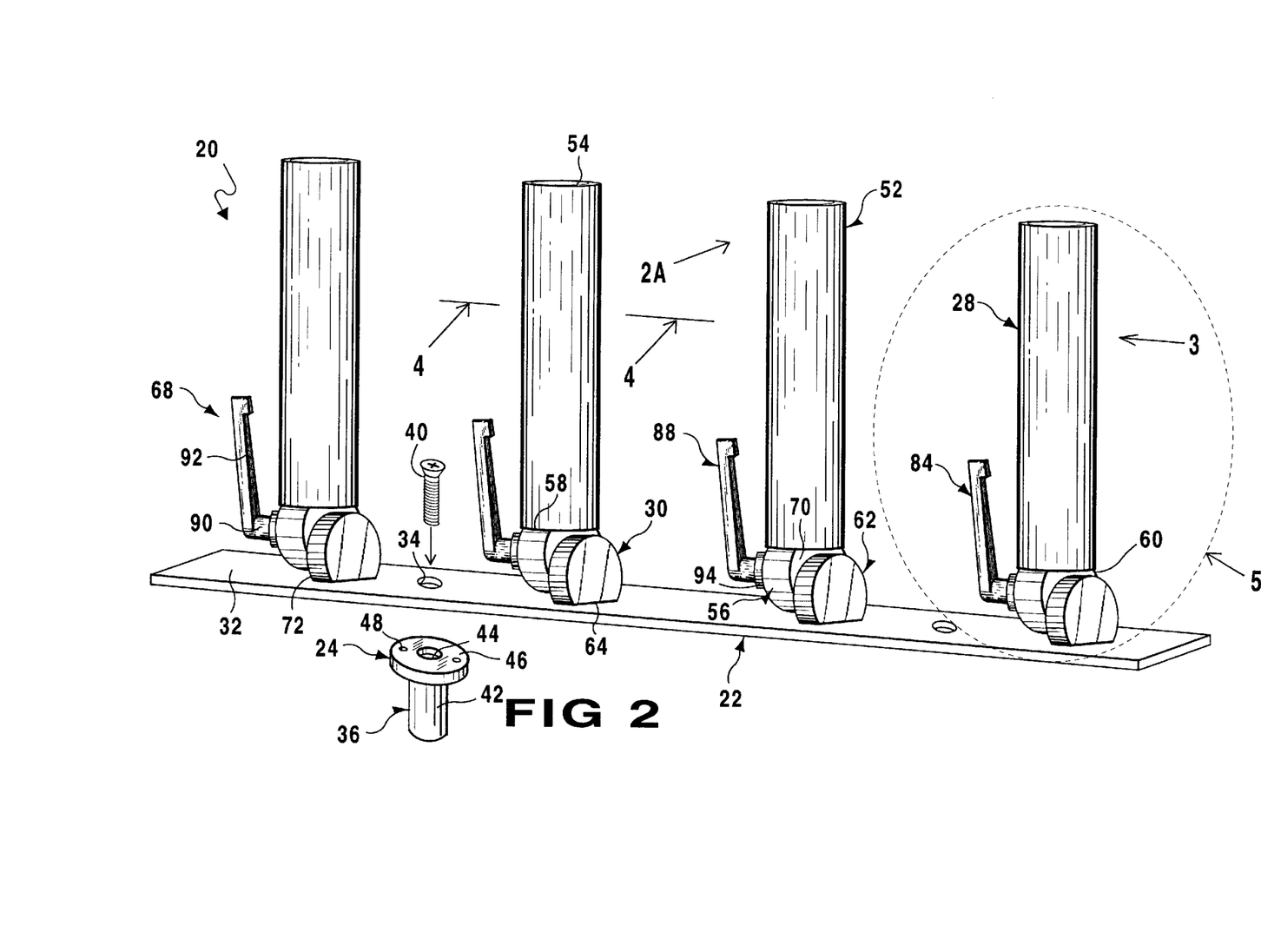
FIG. 2 is a perspective view of the present invention per se, taken in the direction of arrow 2 in FIG. 1.
Figure 2A:
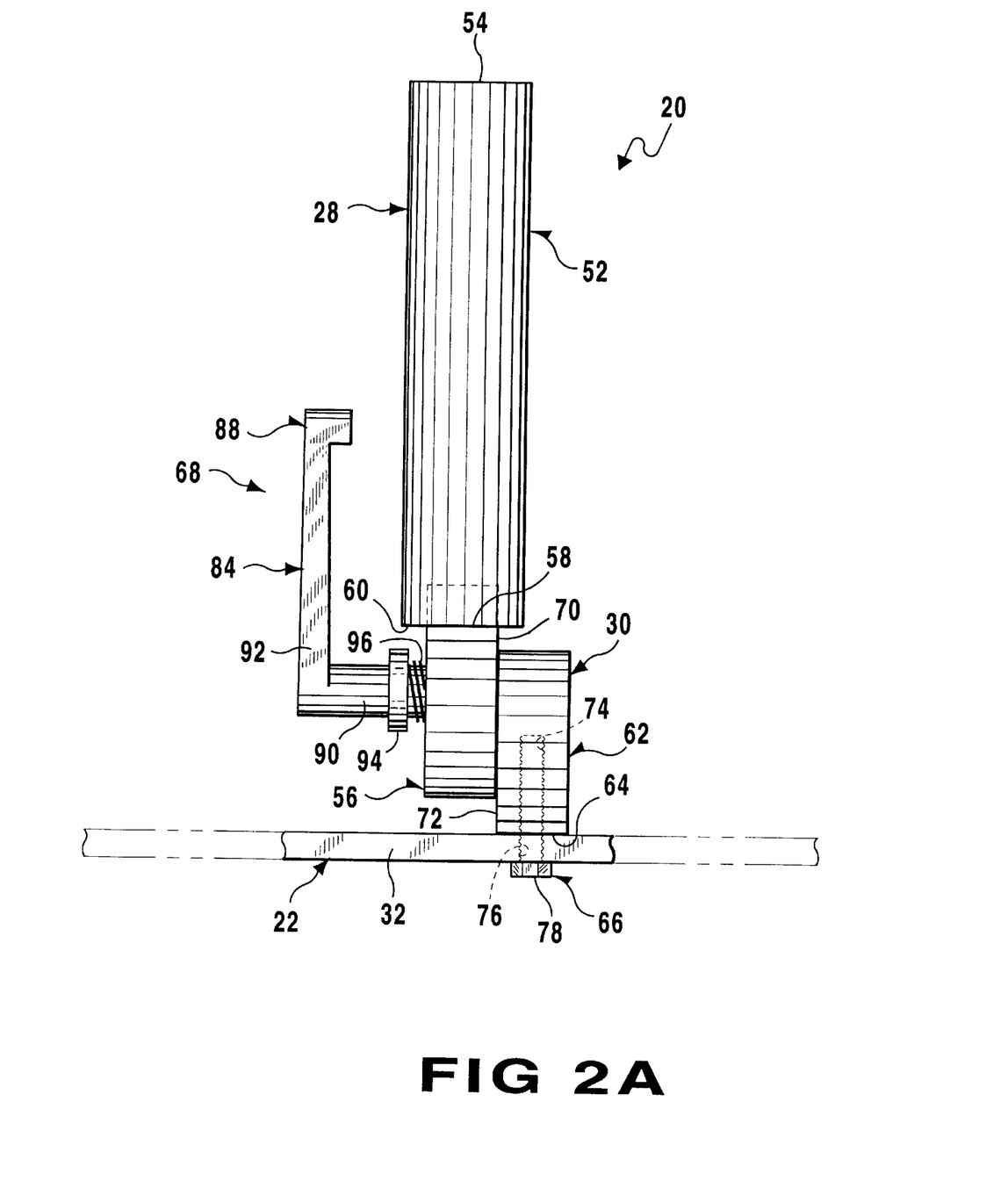
FIG. 2A is a front elevational view taken in the direction of arrow 2A in FIG. 2, showing one of the fishing rod holders in greater detail attached to the base member.
Figure 2B:
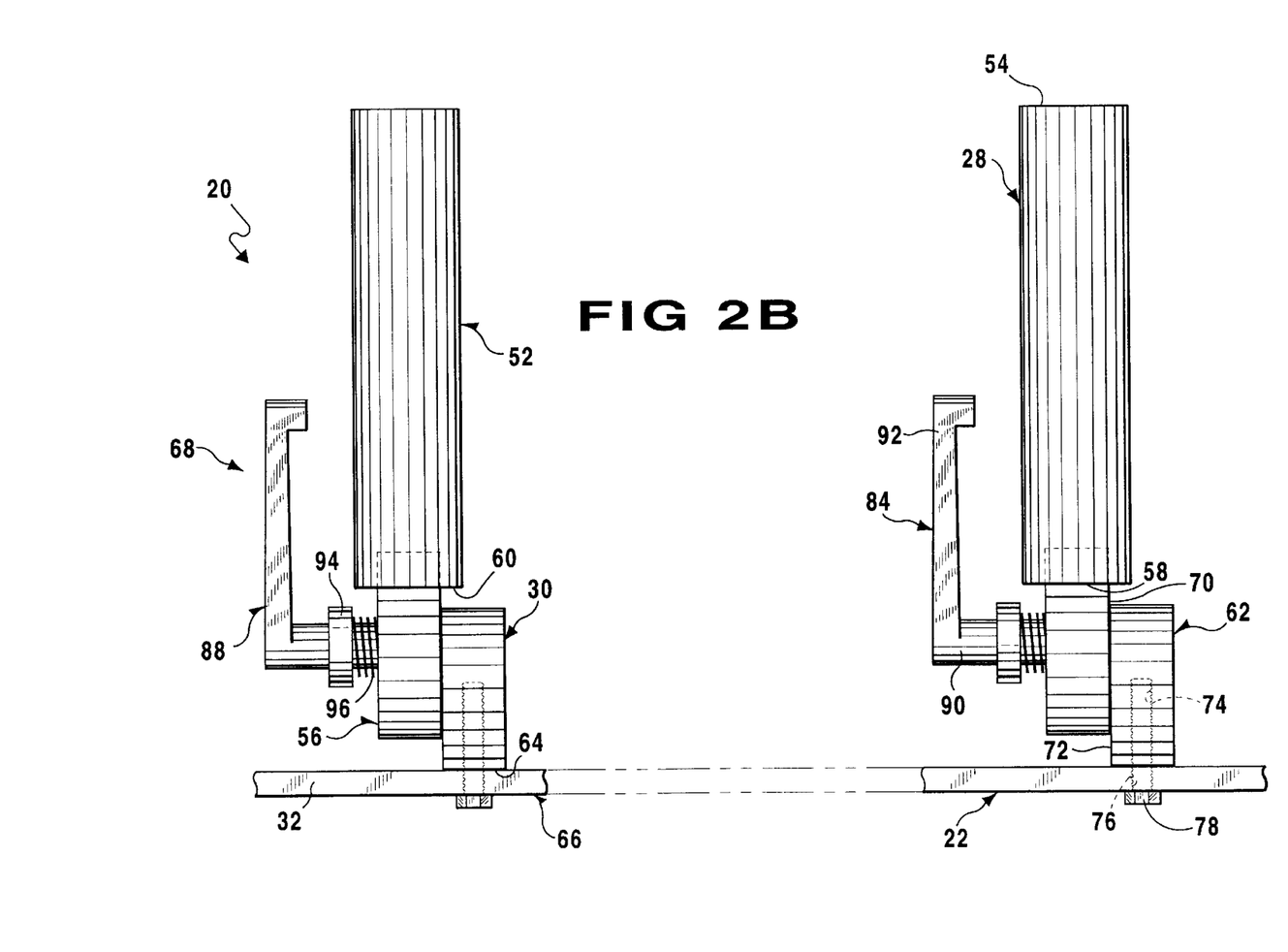
FIG. 2B is a front elevational view similar to FIG. 2A, showing two of the fishing rod holders in greater detail attached to the base member.
Figure 2C:
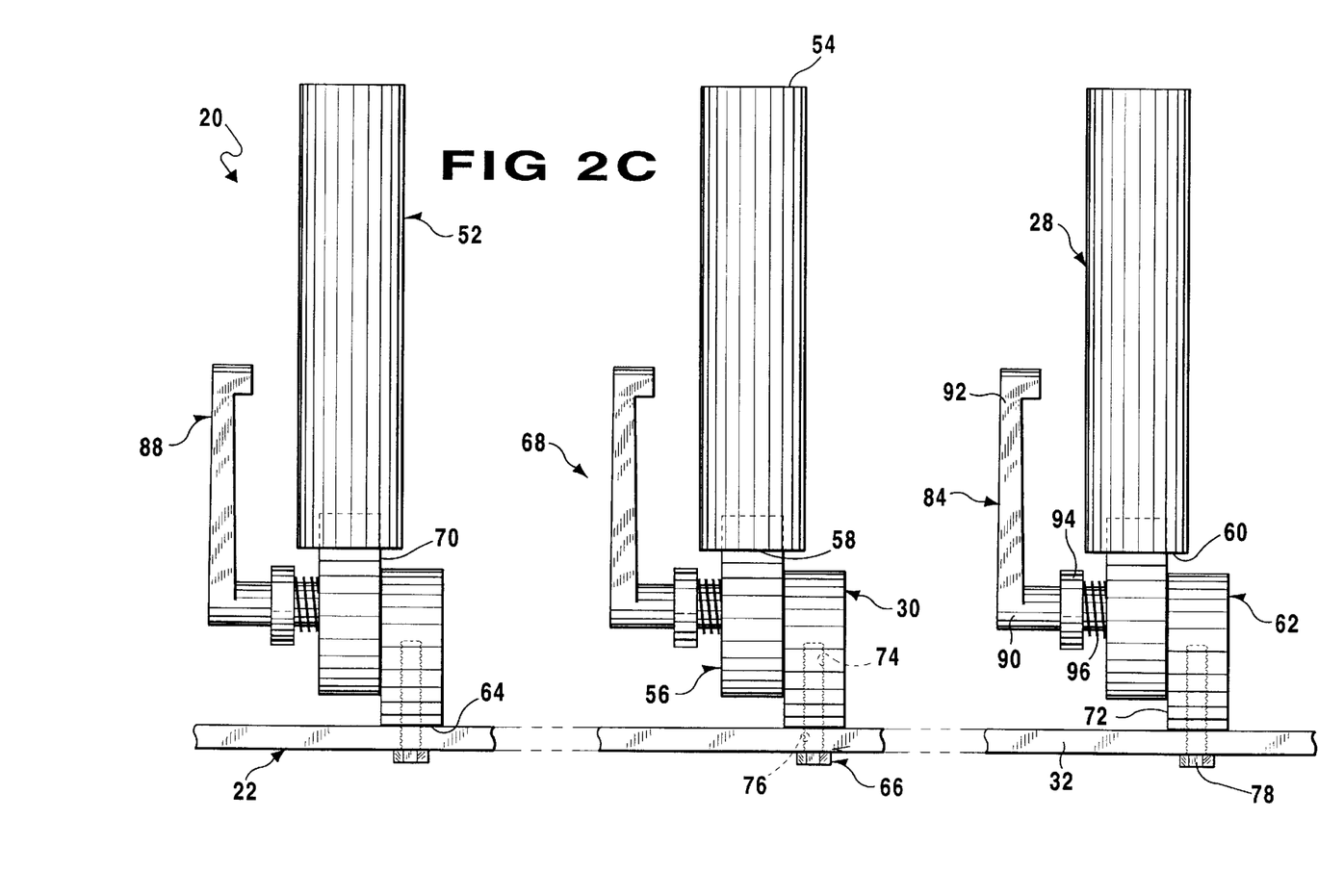
FIG. 2C is a front elevational view similar to FIG. 2B, showing three of the fishing rod holders in greater detail attached to the base member.
Figure 3:
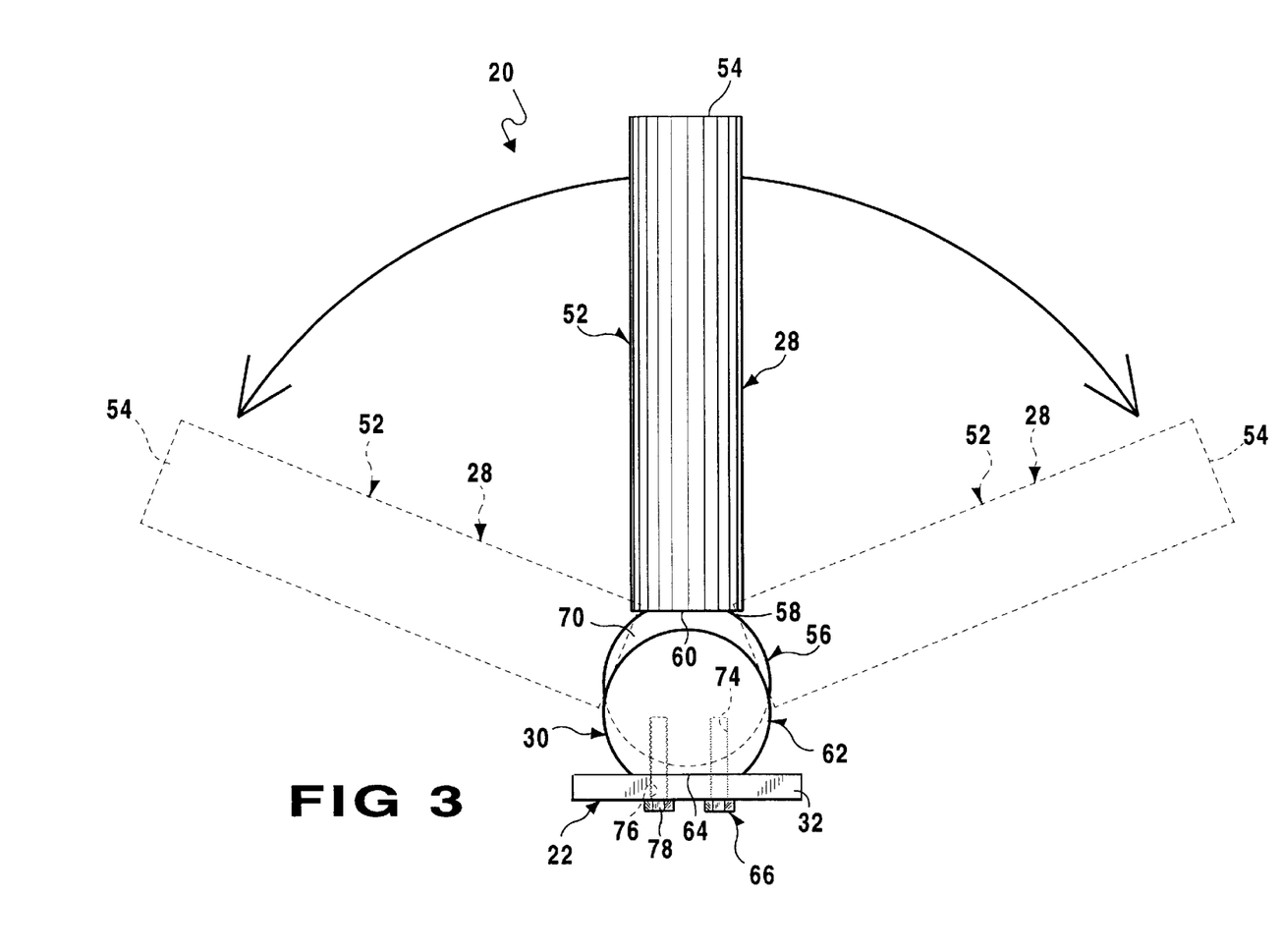
FIG. 3 is a side elevational view taken in the direction of arrow 3 in FIG. 2, showing the forward and rearward stops of a one hundred and eighty degree adjusting swing for the fishing rod holder.
Figure 4:
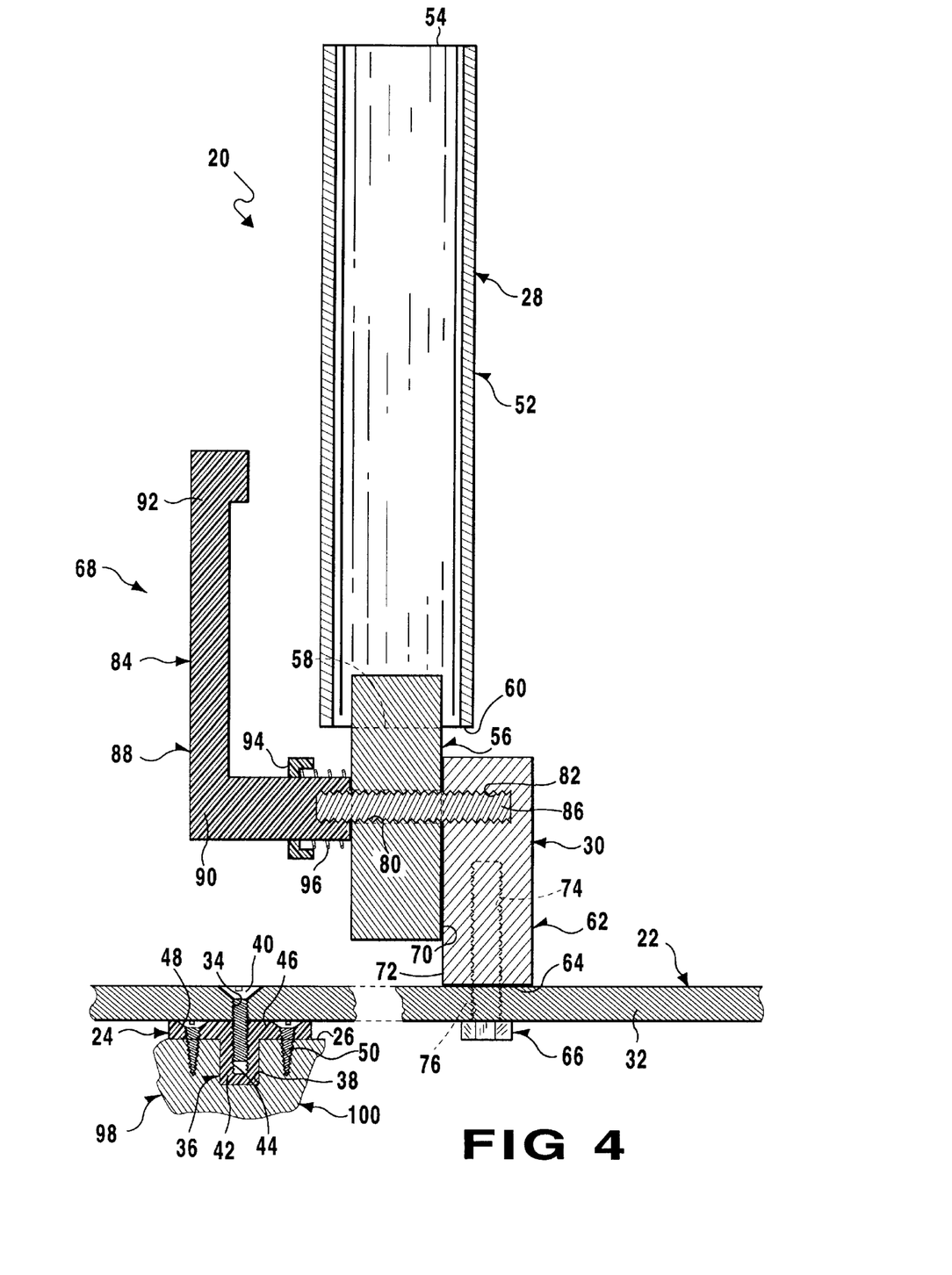
FIG. 4 is a cross sectional view taken along line 4—4 in FIG. 2.
Figure 5:
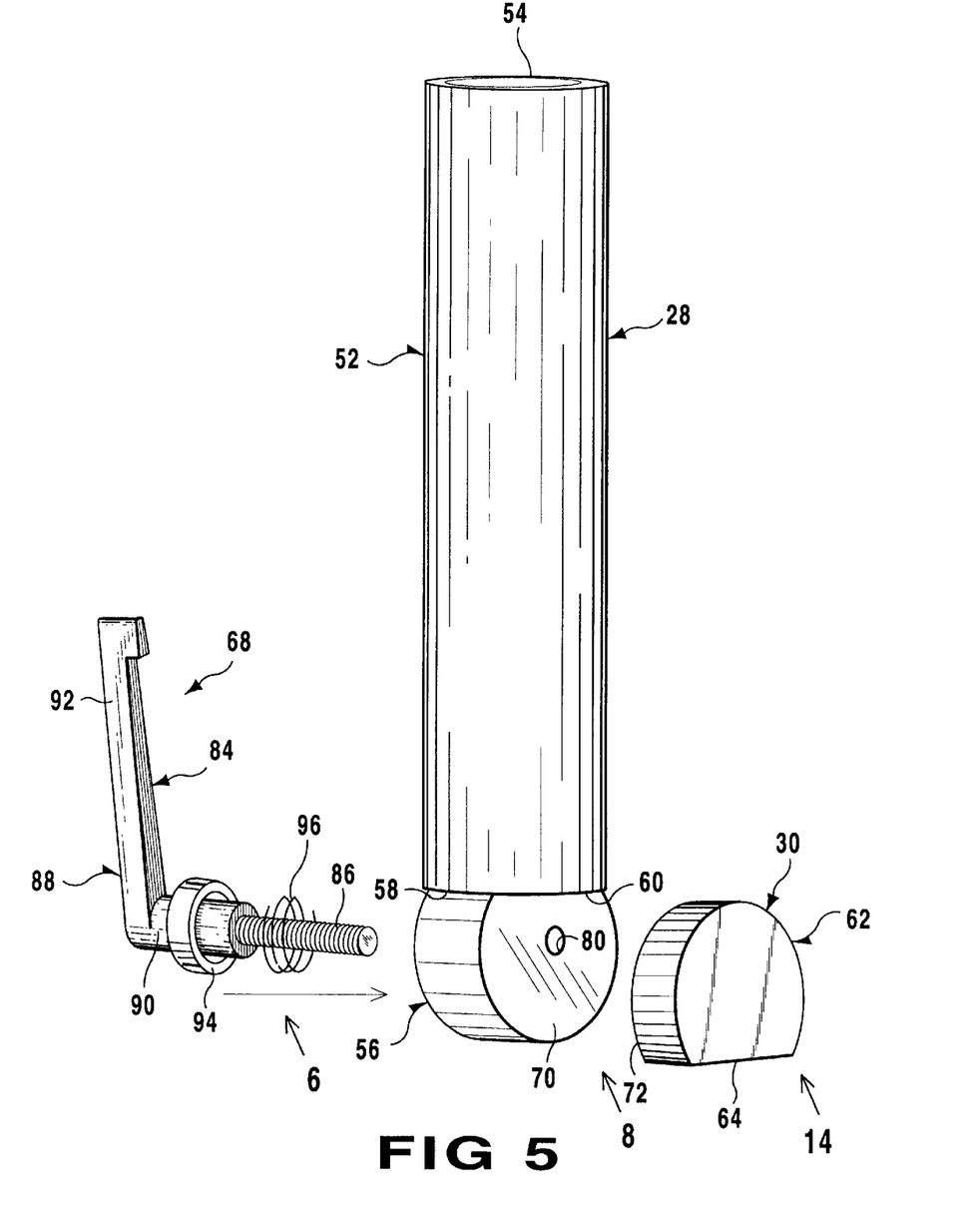
FIG. 5 is an exploded perspective view of an area indicated by arrow 5 in FIG. 2.
Figure 6:
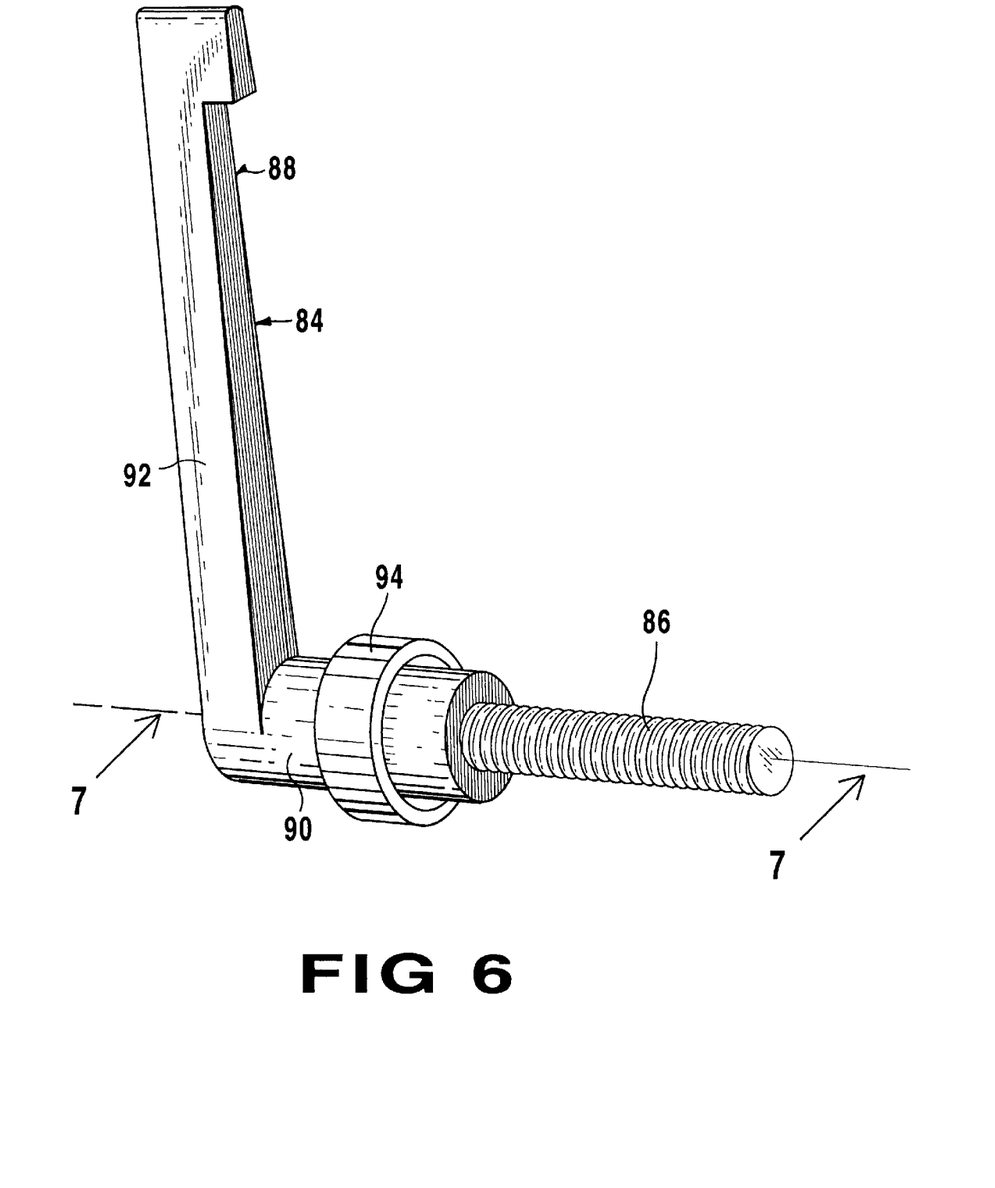
FIG. 6 is a perspective view of the locking lever taken in the direction of arrow 6 in FIG. 5, with the spring removed therefrom.
Figure 7:
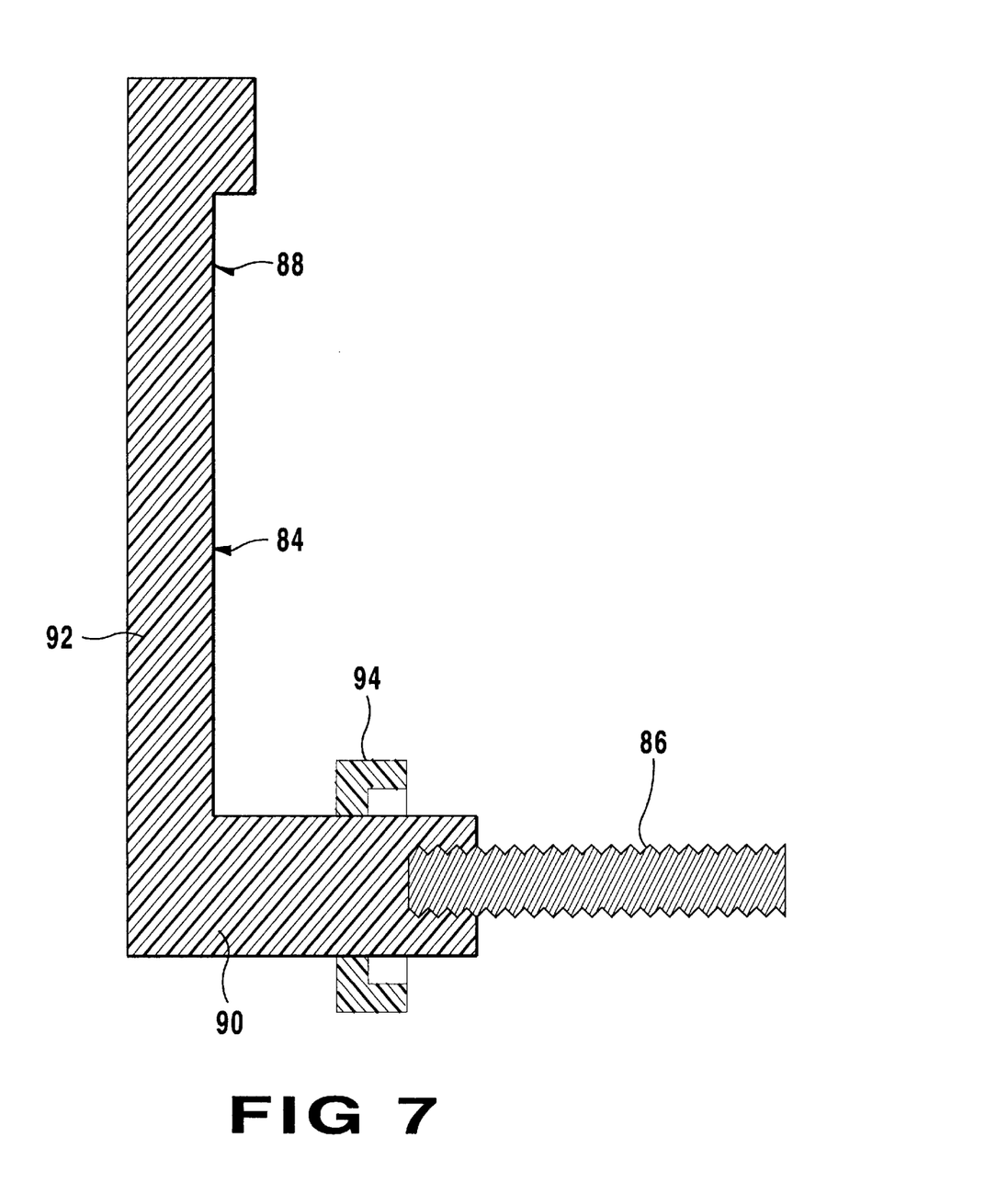
FIG. 7 is a cross sectional view taken along line 7—7 in FIG. 6.
Figures 8, 9:
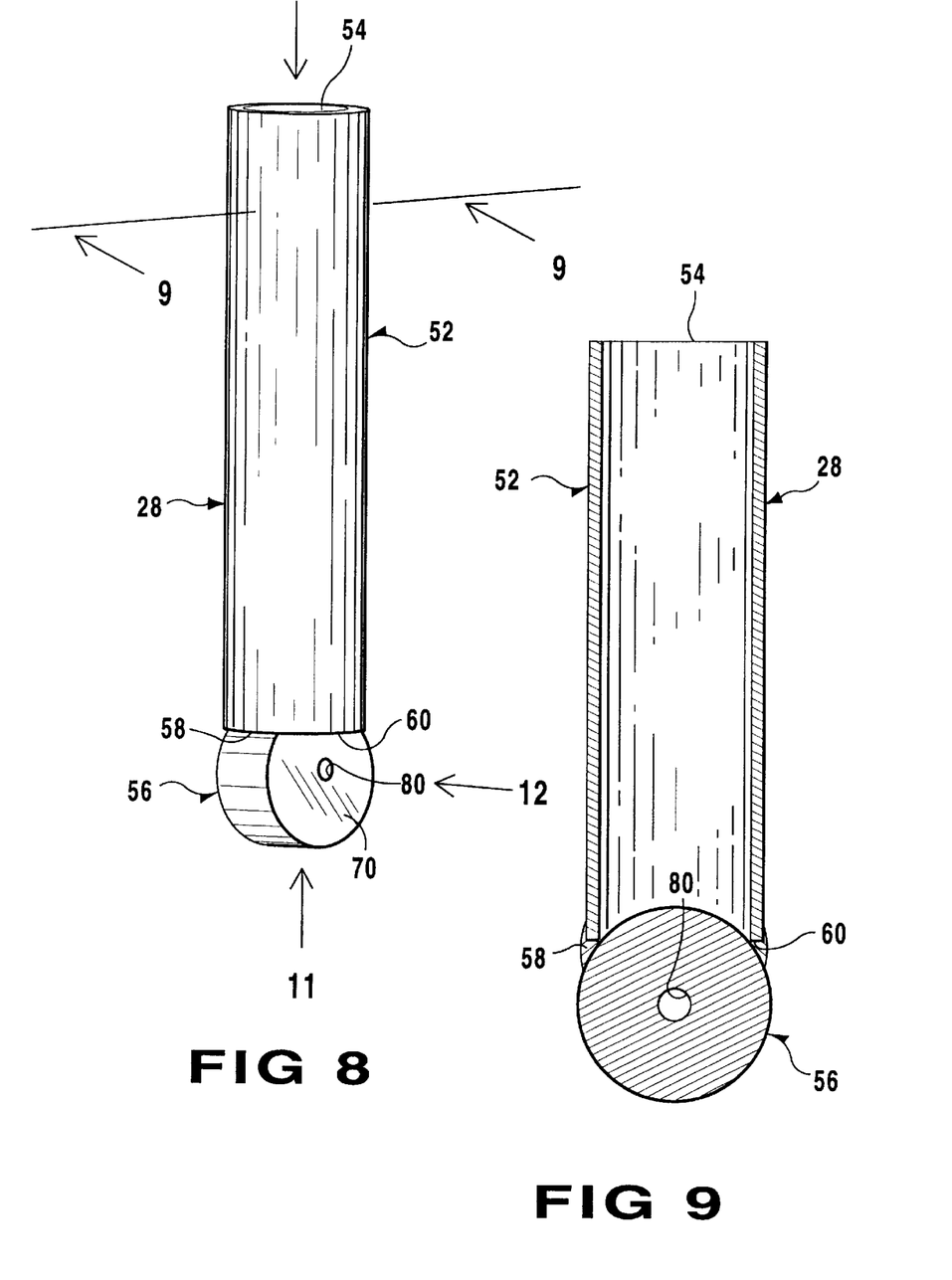
FIG. 8 is a perspective view of the tube and pivot disk, taken in the direction of arrow 8 in FIG. 5.
FIG. 9 is a cross sectional view taken along line 9—9 in FIG. 8.
Figure 10:
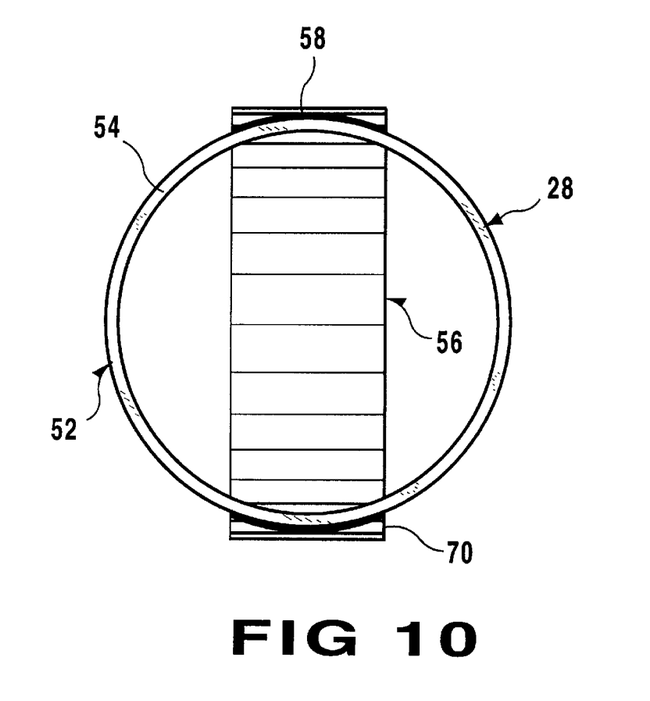
FIG. 10 is a top plan view taken in the direction of arrow 10 in FIG. 8.
Figure 11:
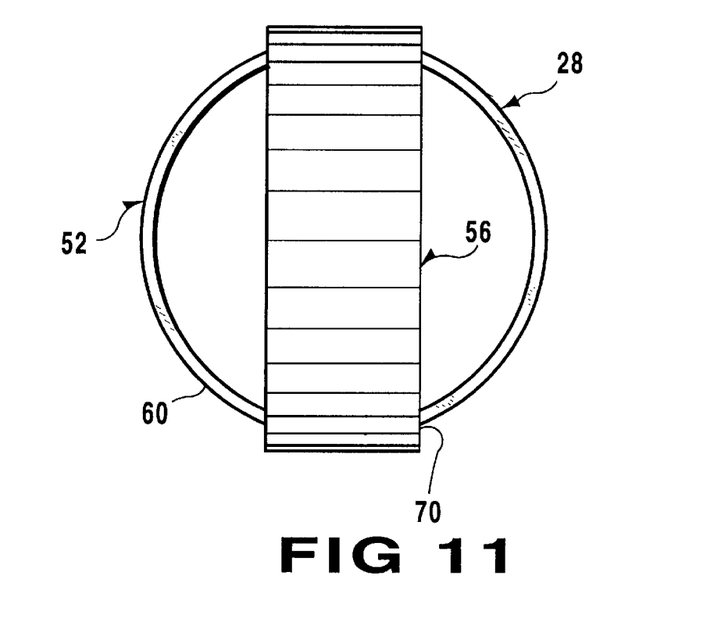
FIG. 11 is a bottom plan view taken in the direction of arrow 11 in FIG. 8.
Figure 12:
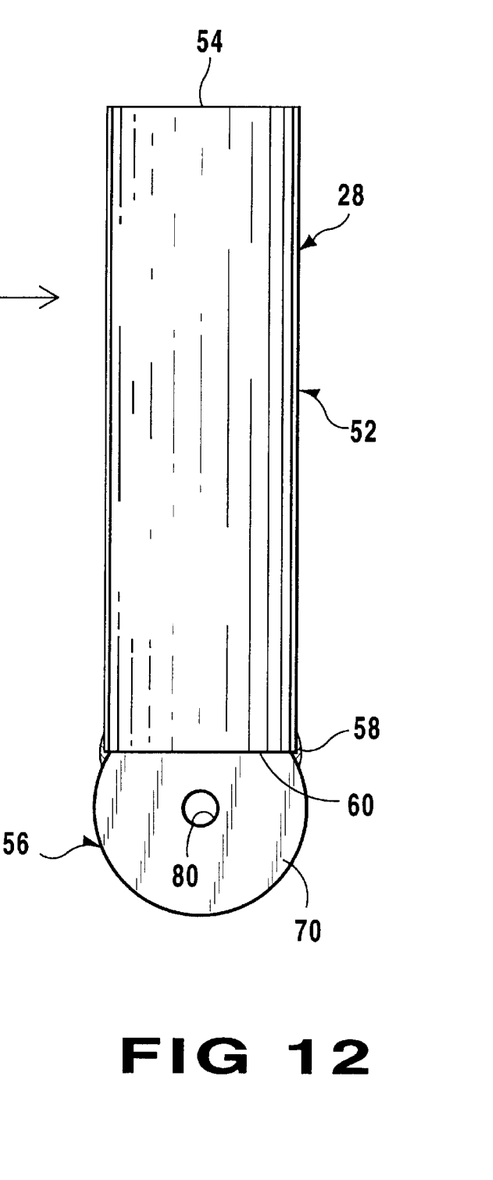
FIG. 12 is a side elevational view taken in the direction of arrow 12 in FIG. 8.
Figure 13:
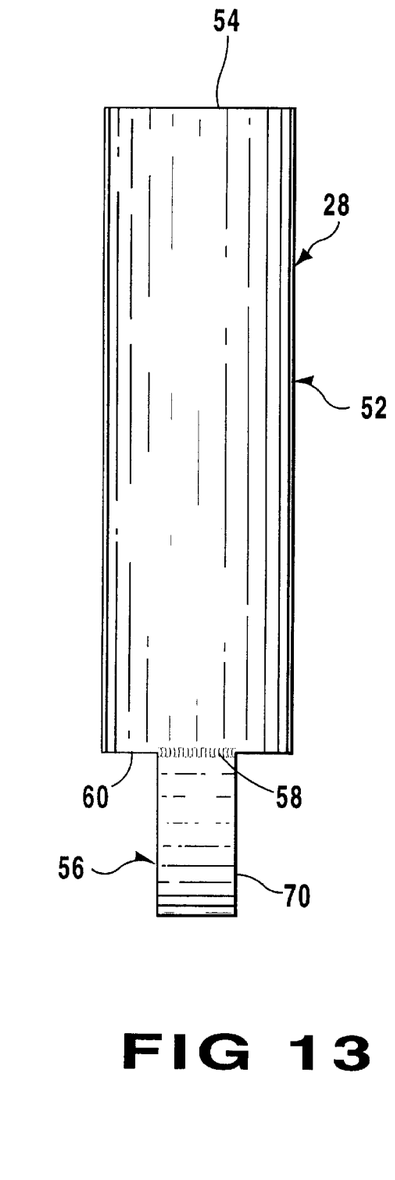
FIG. 13 is a front elevational view taken in the direction of arrow 13 in FIG. 12.
Figure 14:
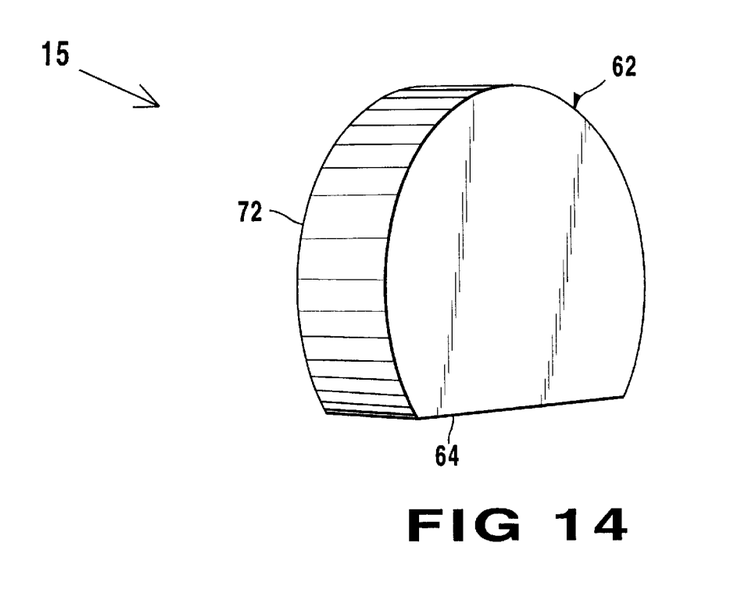
FIG. 14 is a front perspective view of the stationary disk taken in the direction of arrow 14 in FIG. 5.
Figure 15:
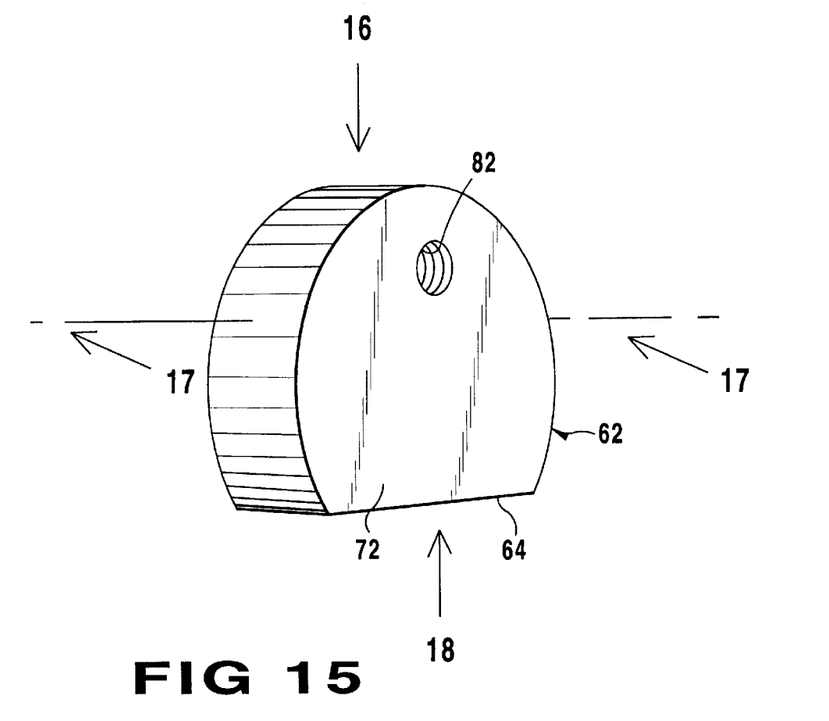
FIG. 15 is a rear perspective view taken in the direction of arrow 15 in FIG. 14.
Figure 16:
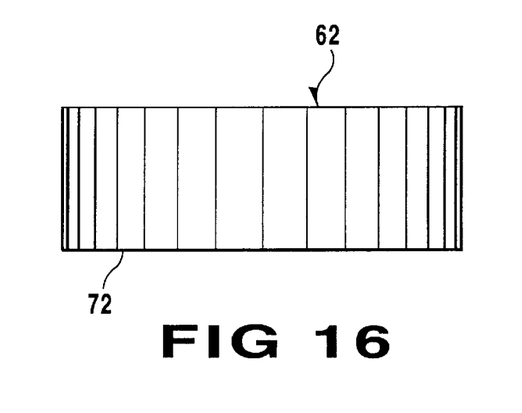
FIG. 16 is a top plan view taken in the direction of arrow 16 in FIG. 15.
Figure 17:
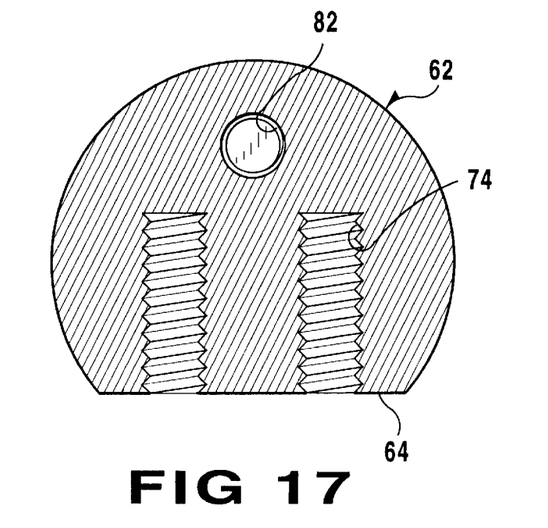
FIG. 17 is a cross sectional view taken along line 17—17 in FIG. 15.
Figure 18:
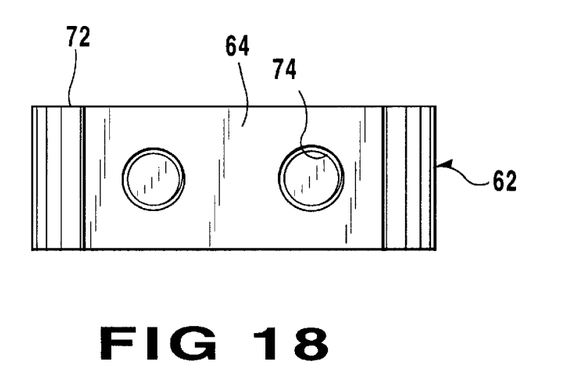
FIG. 18 is a bottom plan view taken in the direction of arrow 18 in FIG. 15.

The locking lever 84 includes an L-shaped handle 88 having a cylindrical short leg 90 and a long arm 92. The cylindrical short leg 90 has the threaded shank 86 extending from its free end. A collar 94 is affixed onto the cylindrical short leg 90 adjacent to the free end. A spring 96 is placed onto the cylindrical short leg 90 between the collar 92 and a second side 96 of the pivot disk 56. The base member 22 is mounted by the mounting facility 24 onto a gunwale 98 of a boat 100, as shown in FIGS. 1 and 4.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fishing rod holder device comprising:
    a) a base member;
    b) means for mounting said base member onto a horizontal support surface;
    c) a plurality of fishing rod holders, each said fishing rod holder including:
        i) a tube having an open top to receive a handle of a fishing rod therein; and
        ii) a pivot disk vertically attached to a bottom end of said tube; and
    d) means for attaching each said fishing rod holder onto said base member in an upwardly extending angle adjustable manner, said attaching means including:
        i) a stationary disk having a flat area upon its perimeter and a pair of spaced apart threaded bores extending inwardly from said flat area;
        ii) means for affixing said flat area of said stationary disk transversely across said base member, so that said stationary disk stands upright upon said base member; and
        iii) means for retaining a first side of said pivot disk against an abutting side of said stationary disk, so that said tube can swing and be maintained between forward and rearward stops of a one hundred and eighty degree adjustment swing, when said bottom end of said tube makes contact with said stationary disk, wherein said base member includes a pair of threaded holes spaced apart transversely thereacross in alignment with said threaded bores in said stationary disk and a pair of bolts are each threaded through said threaded holes in said base member and said threaded bores in said stationary disk.

2. A fishing rod holder device as recited in claim 1, wherein said base member is an elongated rectangular plate.

3. A fishing rod holder device as recited in claim 1, wherein said mounting means includes:
    a) said base member having a plurality of spaced apart mounting holes therethrough;
    b) a plurality of plugs, in which each said plug is secured into an aperture within the horizontal support surface directly under each said mounting hole in said base member; and
    c) a plurality of fasteners, in which each said fastener extends through one said mounting hole in said base member and into one said plug, thereby allowing said base member to be removably mounted onto the horizontal support surface.

4. A fishing rod holder device as recited in claim 3, wherein each said plug includes:
    a) a cylindrical sleeve having a threaded bore therethrough, to receive one said fastener being a bolt; and
    b) an annular flange about a top end of said cylindrical sleeve, said annular flange having a plurality of openings therethrough, so that a plurality of screws can secure said annular flange to the horizontal support surface after said cylindrical sleeve is inserted into the aperture in the horizontal support surface.

5. A fishing rod holder device as recited in claim 1, wherein said base member is mounted by said mounting means onto a gunwale of a boat.

6. A fishing rod holder device as recited in claim 2, wherein said mounting means includes:
    a) said base member having a plurality of spaced apart mounting holes therethrough;
    b) a plurality of plugs, in which each said plug is secured into an aperture within the horizontal support surface directly under each said mounting hole in said base member; and
    c) a plurality of fasteners, in which each said fastener extends through one said mounting hole in said base member and into one said plug, thereby allowing said base member to be removably mounted onto the horizontal support surface.

7. A fishing rod holder device as recited in claim 6, wherein each said plug includes:
    a) a cylindrical sleeve having a threaded bore therethrough, to receive one said fastener being a bolt; and
    b) an annular flange about a top end of said cylindrical sleeve, said annular flange having a plurality of openings therethrough, so that a plurality of screws can secure said annular flange to the horizontal support surface after said cylindrical sleeve is inserted into the aperture in the horizontal support surface.

8. A fishing rod holder device as recited in claim 4, wherein said retaining means includes:
    a) said pivot disk having a threaded central aperture therethrough;
    b) said stationary disk having a threaded upper offset bore extending inwardly from said abutting side; and c) a locking lever having a threaded shank to thread through said threaded central aperture in said pivot disk and into said threaded upper offset bore in said stationary disk, so that when said locking lever is tightened said pivot disk will be maintained in a stationary position against said stationary disk.

9. A fishing rod holder device as recited in claim 8, wherein said locking lever includes:

a) an L-shaped handle having a cylindrical short leg and a long arm, said cylindrical short leg having said threaded shank extending from its free end;

b) a collar affixed onto said cylindrical short leg adjacent to said free end; and c) a spring placed onto said cylindrical short leg between said collar and a second side of said pivot disk.

10. A fishing rod holder device as recited in claim 9, wherein said base member is mounted by said mounting means onto a gunwale of a boat.

11. A fishing rod holder device comprising:

a) a base member;

b) means for mounting said base member onto a horizontal support surface;

c) a plurality of fishing rod holders, each said fishing rod holder including:

i) a tube having an open top to receive a handle of a fishing rod therein; and ii) a pivot disk vertically attached to a bottom end of said tube and having a threaded central aperture therethrough; and d) means for attaching each said fishing rod holder onto said base member in an upwardly extending angle adjustable manner, said attaching means including i) a stationary disk having a flat area upon its perimeter;

ii) means for affixing said flat area of said stationary disk transversely across said base member, so that said stationary disk stands upright upon said base member; and iii) means for retaining a first side of said pivot disk against an abutting side of said stationary disk, so that said tube can swing and be maintained between forward and rearward stops of a one hundred and eighty degree adjustment swing, when said bottom end of said tube makes contact with said stationary disk, wherein said stationary disk includes a threaded upper offset bore extending inwardly from said abutting side; and iv) a locking lever having a threaded shank to thread through said threaded central aperture in said pivot disk and into said threaded upper offset bore in said stationary disk, so that when said locking lever is tightened said pivot disk will be maintained in a stationary position against said stationary disk.

12. A fishing rod holder device as recited in claim 11, wherein said locking lever includes:

a) an L-shaped handle having a cylindrical short leg and a long arm, said cylindrical short leg having said threaded shank extending from its free end;

b) a collar affixed onto said cylindrical short leg adjacent to said free end; and c) a spring placed onto said cylindrical short leg between said collar and a second side of said pivot disk.

* * * * *